United States Patent
Allen

(10) Patent No.: US 9,676,041 B2
(45) Date of Patent: Jun. 13, 2017

(54) POWER TOOL ACCESSORY

(71) Applicant: Milwaukee Electric Tool Corporation, Brookfield, WI (US)

(72) Inventor: Douglas W. Allen, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 580 days.

(21) Appl. No.: 13/945,481

(22) Filed: Jul. 18, 2013

(65) Prior Publication Data

US 2014/0023445 A1  Jan. 23, 2014

Related U.S. Application Data

(60) Provisional application No. 61/673,137, filed on Jul. 18, 2012.

(51) Int. Cl.
*B23B 51/02* (2006.01)
*B23B 51/00* (2006.01)

(52) U.S. Cl.
CPC ........ *B23B 51/009* (2013.01); *B23B 51/0081* (2013.01); *B23B 2231/0204* (2013.01); *B23B 2240/00* (2013.01); *B23B 2251/02* (2013.01); *B23B 2251/54* (2013.01); *Y10T 408/78* (2015.01); *Y10T 408/906* (2015.01)

(58) Field of Classification Search
CPC .......... B23B 51/009; B23B 2231/0204; B23B 2231/0228; B23B 2231/04; B23B 2251/02; B23B 2251/242; B23B 2251/245; B23B 2251/54; Y10T 408/905; Y10T 408/9065; Y10T 408/906; Y10T 408/907; Y10T 408/78

USPC .......................................... 408/223–226, 144
See application file for complete search history.

(56) References Cited

U.S. PATENT DOCUMENTS

| | | | | |
|---|---|---|---|---|
| 499,098 A | * | 6/1893 | Comstock | 408/224 |
| 1,156,336 A | * | 10/1915 | Wegland | 279/99 |
| 2,537,818 A | * | 1/1951 | Evans | B23D 77/02 |
| | | | | 408/144 |
| 2,595,090 A | * | 4/1952 | Middleton | B23B 27/1611 |
| | | | | 407/10 |

(Continued)

FOREIGN PATENT DOCUMENTS

| DE | 4218886 A1 | * | 12/1993 | B23G 5/00 |
|---|---|---|---|---|
| JP | 2003-011016 | * | 1/2003 | B23C 5/10 |

OTHER PUBLICATIONS

M2 Molybdenum High Speed Tool Steel (UNS T11302), AZO Materials (Jul. 17, 2012) available at http://www.azom.com/article.aspx?ArticleID=6174 (last visited Dec. 18, 2015).*

(Continued)

*Primary Examiner* — Sunil K Singh
*Assistant Examiner* — Ryan Rufo
(74) *Attorney, Agent, or Firm* — Michael Best & Friedrich LLP

(57) ABSTRACT

A power tool accessory includes a shank member having a first hardness. A conically-shaped body is coupled to the shank member and includes a series of stepped shoulders that increase in diameter from a tip portion to a base portion. A flute extends substantially from the tip portion to the base portion, with cutting edges defined at the intersection of the flute and the shoulders. The body has a second hardness greater than the first hardness.

12 Claims, 3 Drawing Sheets

(56) References Cited

U.S. PATENT DOCUMENTS

| | | | | |
|---|---|---|---|---|
| 3,053,118 | A | * | 9/1962 | Lavallee .................. 76/108.1 |
| 3,307,243 | A | * | 3/1967 | Andreasson ........ B23B 51/0486 407/11 |
| 3,519,091 | A | * | 7/1970 | Leibee .................. E21B 17/03 175/320 |
| 3,645,640 | A | * | 2/1972 | Zukas .......................... 408/192 |
| 4,061,376 | A | | 12/1977 | Villaloboz |
| 4,127,355 | A | * | 11/1978 | Oakes .......................... 408/225 |
| 4,383,784 | A | * | 5/1983 | Gulbrandsen ................ 408/144 |
| 4,573,839 | A | * | 3/1986 | Finnegan .................. 408/239 R |
| 4,605,079 | A | * | 8/1986 | Leibee .................. E21B 10/38 175/393 |
| 4,902,177 | A | | 2/1990 | Burnett |
| 5,099,933 | A | | 3/1992 | Schimke et al. |
| 5,116,172 | A | | 5/1992 | Koster |
| 5,161,726 | A | * | 11/1992 | Francis ................ B23B 51/108 228/19 |
| 5,220,967 | A | | 6/1993 | Monyak |
| 5,417,475 | A | | 5/1995 | Graham et al. |
| 5,427,477 | A | * | 6/1995 | Weiss .......................... 408/1 R |
| 5,466,100 | A | * | 11/1995 | Ahluwalia .................. 408/224 |
| 5,704,261 | A | | 1/1998 | Strauch et al. |
| 5,823,632 | A | | 10/1998 | Burkett |
| 5,899,642 | A | | 5/1999 | Berglöw et al. |
| 5,915,893 | A | * | 6/1999 | Miyanaga .................... 408/202 |
| 6,015,248 | A | | 1/2000 | Elliott et al. |
| 6,030,157 | A | * | 2/2000 | Erpenbeck .................. 408/226 |
| 6,039,127 | A | | 3/2000 | Myers |
| 6,065,905 | A | | 5/2000 | Kinton |
| 6,196,636 | B1 | | 3/2001 | Mills et al. |
| 6,213,692 | B1 | | 4/2001 | Guehring et al. |
| 6,595,305 | B1 | | 7/2003 | Dunn et al. |
| 6,655,882 | B2 | | 12/2003 | Heinrich et al. |
| 6,823,951 | B2 | | 11/2004 | Yong et al. |
| 7,185,568 | B1 | * | 3/2007 | Vance .................. B25B 23/0021 16/110.1 |
| 7,338,051 | B2 | | 3/2008 | Buchholz |
| 7,458,646 | B2 | | 12/2008 | Marathe et al. |
| D626,575 | S | * | 11/2010 | Washington, III ........... D15/139 |
| 2002/0182021 | A1 | * | 12/2002 | Hsieh .......................... 408/144 |
| 2003/0002940 | A1 | * | 1/2003 | Forth et al. .................. 408/226 |
| 2003/0082020 | A1 | * | 5/2003 | Lin et al. ...................... 408/144 |
| 2004/0076483 | A1 | | 4/2004 | Singh et al. |
| 2005/0117984 | A1 | * | 6/2005 | Eason et al. .................. 408/144 |
| 2007/0264094 | A1 | * | 11/2007 | Seeley .......................... 408/224 |
| 2008/0029311 | A1 | * | 2/2008 | Seeley .......................... 175/413 |
| 2010/0295360 | A1 | | 11/2010 | Krämer et al. |
| 2011/0038679 | A1 | * | 2/2011 | Kozak .......................... 408/1 BD |
| 2012/0168232 | A1 | | 7/2012 | Yong et al. |
| 2012/0207557 | A1 | * | 8/2012 | Durfee .......................... 408/223 |

OTHER PUBLICATIONS

Tool Steel, Alro Steel available at http://www.alro.com/datacatalog/014-toolsteel.pdf (last visited Jan. 8, 2016).*

* cited by examiner

POWER TOOL ACCESSORY

CROSS REFERENCE TO RELATED APPLICATION

This application claims priority to U.S. Provisional Patent Application No. 61/673,137, filed on Jul. 18, 2012, the entire contents of which are herein incorporated by reference.

BACKGROUND

The present invention relates to power tool accessories. More specifically, the invention relates to drills bits and power tool accessories for use with impact drivers.

Drill bits and other power tool accessories that cut a workpiece must fulfill two competing requirements. First, the workpiece engaging surfaces, or cutting edges, must have sufficient wear resistance to allow for cutting performance over a reasonable tool life. Second, the overall tool, and especially the shank, must have sufficient toughness and impact resistance to resist failure due to cyclical stresses, such as use with an impact driver. In general, high wear resistance requires a high material hardness, which, in turn, results in lower toughness and impact resistance.

SUMMARY

In one embodiment, the invention provides a power tool accessory. A shank member has a first hardness. A conically-shaped body is coupled to the shank member and includes a series of stepped shoulders that increase in diameter from a tip portion to a base portion. A flute extends substantially from the tip portion to the base portion, with cutting edges defined at the intersection of the flute and the shoulders. The body has a second hardness greater than the first hardness.

In another embodiment the invention provides a step drill bit. A shank member extending along a tool axis from a first end to a second end. A conically-shaped body includes a series of stepped shoulders that increase in diameter from a tip portion to a base portion. A flute extends substantially from the tip portion to the base portion, with cutting edges defined at the intersection of the flute and the shoulders, the base portion defining a recess for detachably receiving the first end of the shank member. The body has a higher hardness than the shank member.

In another embodiment the invention provides a power tool accessory. A shank portion has a first hardness. A conically-shaped body portion is unitarily formed as one piece with the shank and includes a series of stepped shoulders that increase in diameter from a tip portion to a base portion. A flute extends substantially from the tip portion to the base portion, with cutting surfaces defined at the intersection of the flute and the shoulders. The cutting surfaces have a second hardness greater than the first hardness.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
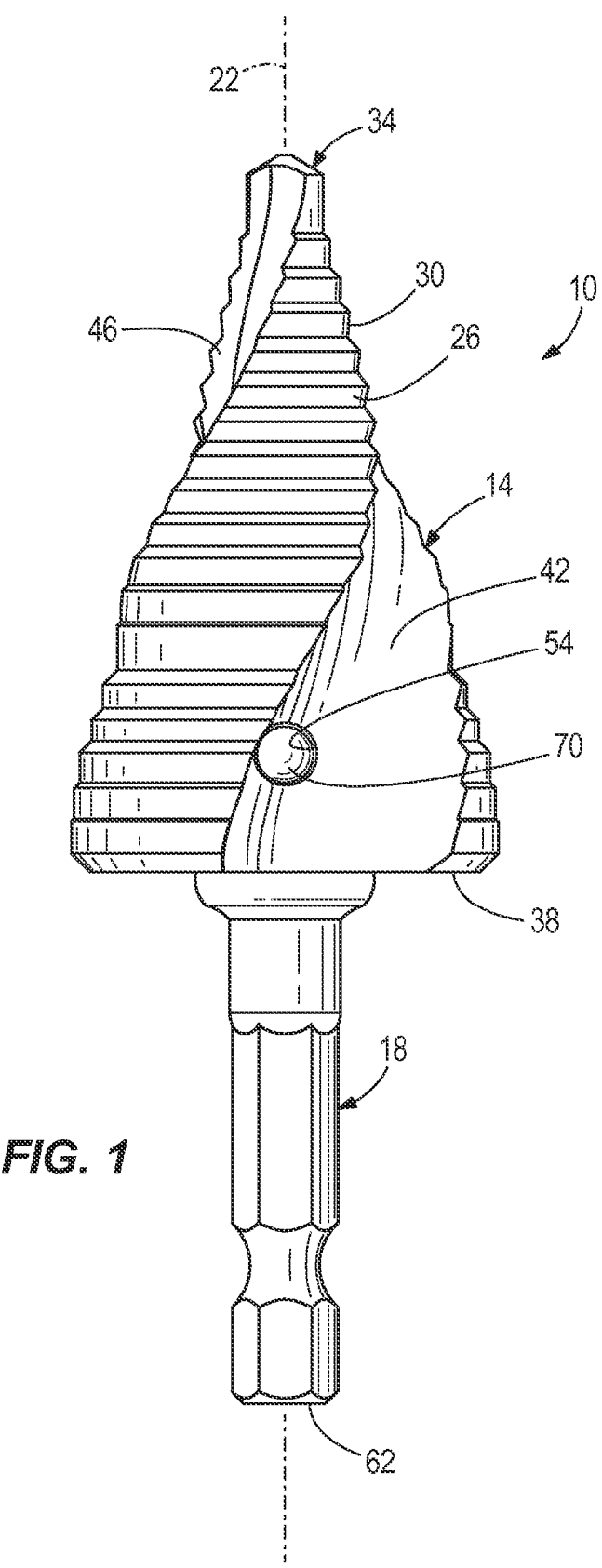
FIG. 1 is a side view of a power tool accessory according to one embodiment of the invention.

Referring to FIG. 1, a power tool accessory 10 includes a workpiece engaging member 14 and a shank member 18 disposed along a tool axis 22.

In the illustrated embodiment, the workpiece engaging member 14 is a step drill member 14. The step drill member 14 includes a generally conically-shaped body 26. The body 26 is defined by a series of stepped shoulders 30 that increase in diameter from a tip portion 34 to a base portion 38. An angled, or spiral cut, flute 42 extends from the tip portion 34 to the base portion 38. Cutting edges 46 are defined at the intersection of the flute 42 and the shoulders 30.

Figure 2:
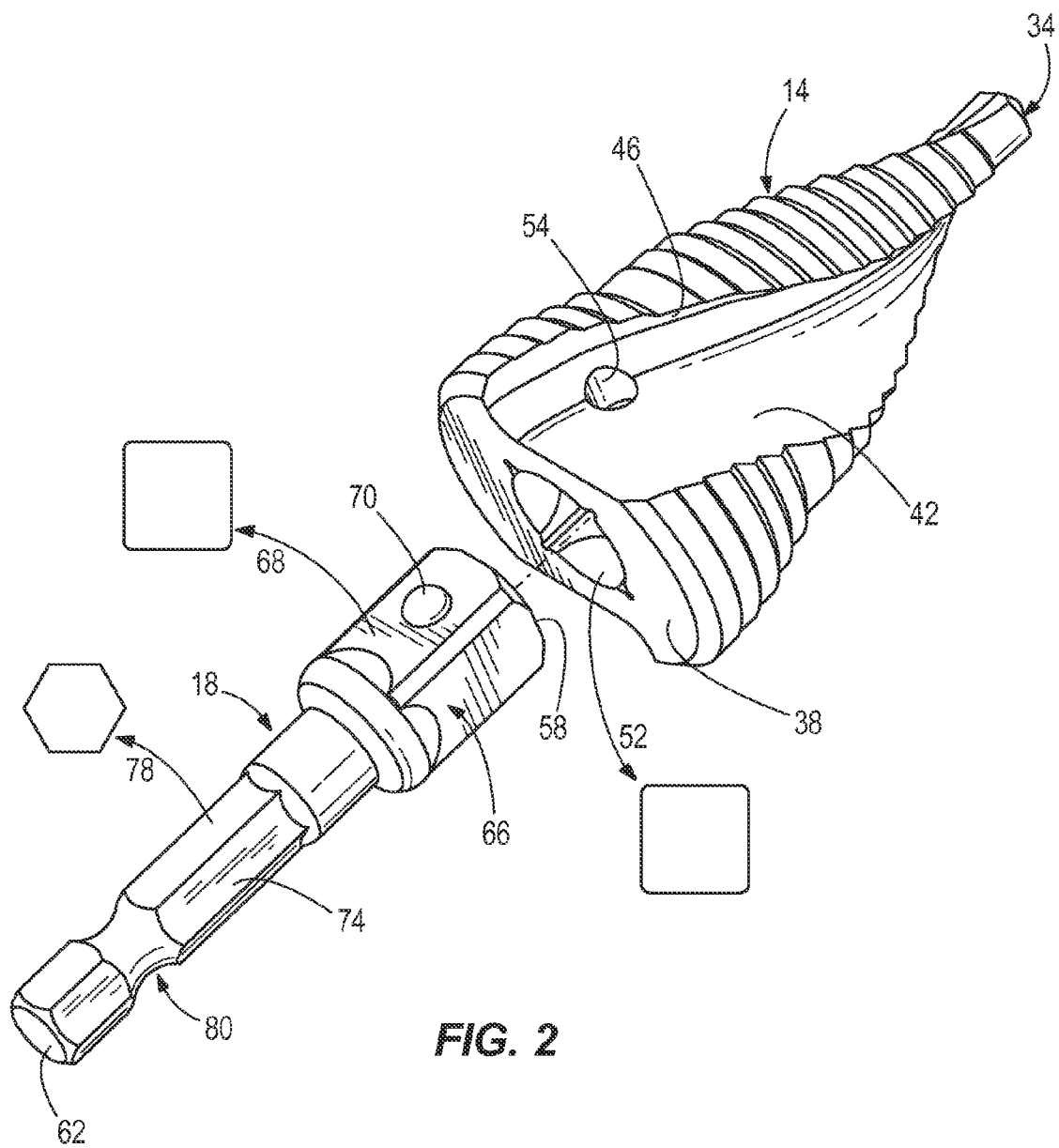
FIG. 2 is an exploded perspective view of the power tool accessory of FIG. 1

Referring to FIG. 2, the base portion 38 defines a drive socket 50 along the tool axis 22. The drive socket 50 has a substantially square cross section 52, and is sized to receive a standard drive (e.g., ¼, ⅜, or ½ inch). In other embodiments, the drive socket may have other cross sectional profiles and sizes. A detent aperture 54 extends from the flute 42 to the drive socket 50 substantially perpendicular to the tool axis 22.

In the illustrated embodiment, the step drill member 14 is formed of high speed steel (HSS) or other wear resistant metal alloys. The HSS may be hardened to a Rockwell-C hardness between approximately 58 HRc and approximately 66 HRc for high wear resistance.

The shank member 18 extends along the tool axis 22 (FIG. 1) from a first end 58 (FIG. 2) to a second end 62. An accessory drive portion 66 extends from the first end 58 toward the second end 62. The accessory drive portion 66 has a substantially square cross section 68, and is configured and sized (e.g., ¼, ⅜, or ½ inch) to be received by the drive socket of an accessory, such as the drive socket 50. A detent ball arrangement 70 is coupled to the accessory drive portion 66. The detent ball arrangement 70 includes a spring (not shown) and is configured to engage with the detent aperture 54 of the drive socket 50.

A shank portion 74 extends from the second end 62 towards the first end 58. The shank portion 74 defines a hexagonal cross section 78. The hexagonal cross section 78 may have a standard diameter (e.g., ¼ inch) to mate with standard hexagonal drive receptacles, as well as three-jaw drill chucks. The shank portion 74 defines a detent recess 80 for retention within quick-release style drive receptacles.

In the illustrated embodiment, the shank member 18 is formed of an impact resistant steel alloy, such as, e.g., SAE 6150 low-alloy steel. The impact resistant steel may be hardened to a Rockwell-C hardness between approximately 48 HRc and approximately 58 HRc for higher impact resistance.

Forming the workpiece engaging member 14 (e.g., the step drill member 14) of a high hardness, high wear-resistance material, and separately forming the shank member 18 of a material with a high impact resistance increases the overall tool life, especially when used with an impact driver.

Figure 3:
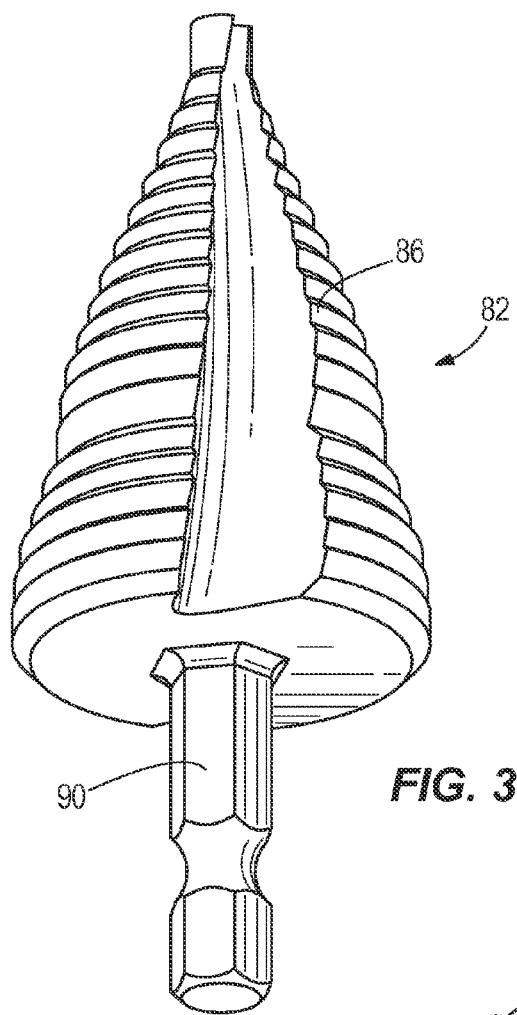
FIG. 3 is a perspective view of a power tool accessory according to another embodiment of the invention.

FIG. 3 illustrates a power tool accessory 82 according to another embodiment of the invention. In the illustrated embodiment, the power tool accessory is a step drill bit 82. The step drill bit 82 includes a conically-shaped body member 86 and a shank member 90. The body member 86 has substantial similarities to the body 26 described with respect to FIGS. 1 and 2, and only the differences will be described herein.

The body member 86 and the shank member 90 are separately formed. The body member 86 is formed of high speed steel (HSS) or other wear resistant metal alloys. The HSS may be hardened to a Rockwell-C hardness between approximately 60 HRc and approximately 64 HRc for high wear resistance. The shank member 90 may be formed, for example, of an impact resistant steel, such as, e.g., SAE 6150 low-alloy steel. The impact resistant steel may be hardened to a Rockwell-C hardness between approximately 50 HRc and approximately 54 HRc for high impact resistance.

After being formed and hardened, the body member 86 and the shank member 90 are permanently coupled together as one piece, such as by welding, brazing, friction welding, threading, an interference fit, adhesives, etc.

Figure 4:
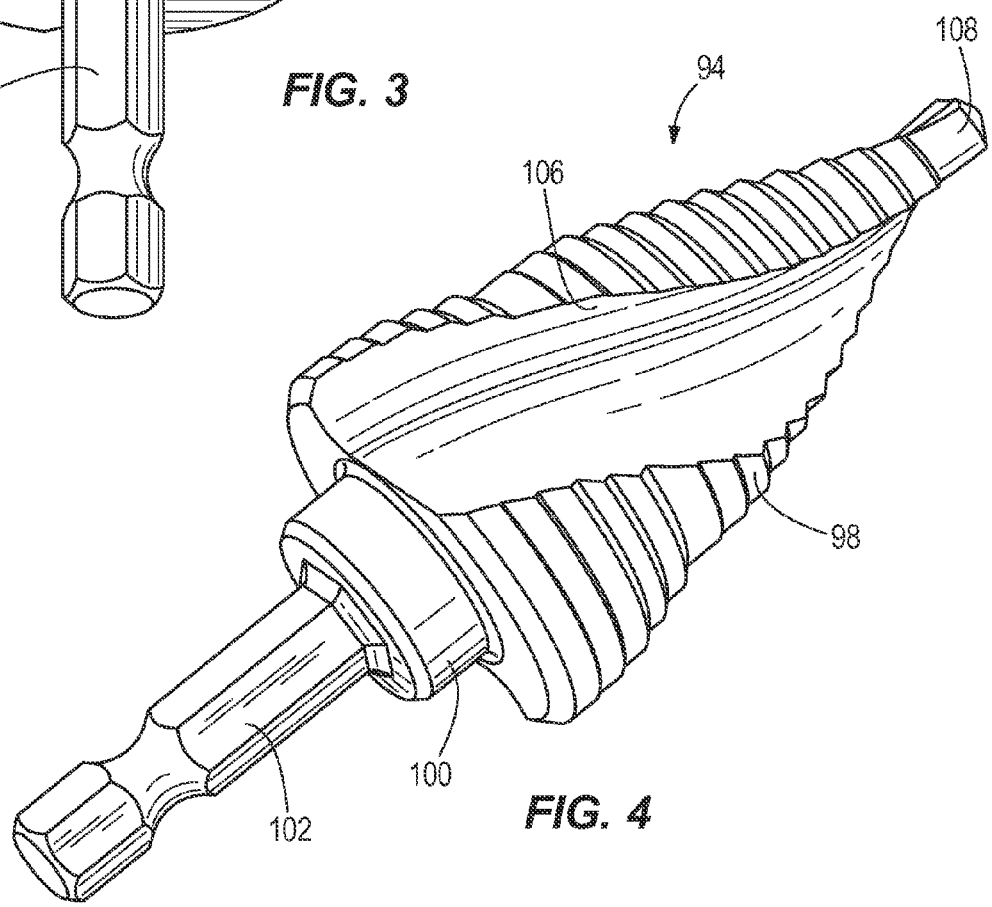
FIG. 4 is a perspective view of a power tool accessory according to yet another embodiment of the invention.

FIG. 4 illustrates a power tool accessory 94 according to yet another embodiment of the invention. In the illustrated embodiment, the power tool accessory 94 is a step drill bit. The step drill bit 94 includes a conically-shaped body portion 98, a transition portion 100, and a shank portion 102. The body portion 98 has substantial similarities to the body 26 described with respect to FIGS. 1 and 2, and only the differences will be described herein.

The body portion 98, the transition portion 100, and the shank portion 102 are unitarily formed as one piece from a single material. In order to provide a combination of impact resistance and wear resistance, the step drill bit 94 is locally hardened. More specifically, the shank portion 102 and a majority of the body portion 98 are heat treated or otherwise hardened to a Rockwell-C hardness between approximately 48 HRc and approximately 56 HRc for high impact resistance. Cutting surfaces 106 and a tip portion 108 of the body portion 98 are locally hardened to a Rockwell-C hardness of between approximately 58 HRc and approximately 66 HRc for high wear resistance. The cutting surfaces 106 and tip portion 108 may be locally hardened by induction hardening.

Alternatively, the body portion 98 and shank portion 102 may be initially hardened to between approximately 60 HRc and approximately 64 HRc, and the shank portion 102 may be subsequently heat treated or locally tempered to reduce the hardness of the shank portion to between 50 HRc and 54 HRc. The transition portion 100 may act as a heat sink between the body portion 98 and the shank portion 102.

Thus, the invention provides, among other things, a power tool accessory of improved impact resistance and wear resistance. Various features and advantages of the invention are set forth in the following claims.

What is claimed is:

1. A power tool accessory comprising:
    a shank member including a shank portion and an accessory drive portion, the shank member having a first hardness;
    a conically-shaped body coupled to the shank member and including a series of stepped shoulders that increase in diameter from a tip portion to a base portion, a flute extending substantially from the tip portion to the base portion, with cutting edges defined at the intersection of the flute and the shoulders, and a drive socket defined in the base portion, wherein the body is separately formed from the shank member and has a second hardness greater than the first hardness;
    wherein the first hardness is between approximately 50 HRc and approximately 54 HRc,
    wherein the accessory drive portion of the shank member has a substantially square cross section and is received within the drive socket of the body, and
    wherein the body includes a detent aperture extending from the flute to the drive socket, and wherein the accessory drive portion of the shank member supports a detent ball arrangement that engages the detent aperture.

2. The power tool accessory of claim 1, wherein the second hardness is between approximately 60 HRc and approximately 64 HRc.

3. The power tool accessory of claim 1, wherein the shank member is formed of a first material and the body is formed of a second material different from the first material.

4. The power tool accessory of claim 1, wherein the body is detachably coupled to the shank member.

5. A step drill bit comprising:
    a shank member extending along a tool axis from a first end to a second end, the shank member including a detent ball; and
    a conically-shaped body including a series of stepped shoulders that increase in diameter from a tip portion to a base portion, a flute extending substantially from the tip portion to the base portion, with cutting edges defined at the intersection of the flute and the shoulders, the base portion defining a recess for detachably receiving the first end of the shank member, wherein the body has a higher hardness than the shank member;
    wherein the body includes a detent aperture extending from the flute to the recess, and wherein the detent ball engages the detent aperture to releasably secure the shank member to the body.

6. The step drill bit of claim 5, wherein the shank member is formed of a first material and the body is formed of a second material different from the first material.

7. The step drill bit of claim 5, wherein the shank member has a hardness between approximately 48 HRc and approximately 58 HRc.

8. The step drill bit of claim 5, wherein the body has a hardness between approximately 58 HRc and approximately 66 HRc.

9. The step drill bit of claim 5, wherein the first end of the shank member has a substantially square cross section.

10. The power tool accessory of claim 5, wherein the body is hardened to a first hardness between approximately 60 HRc and approximately 64 HRc and the shank member is heat treated to a second hardness between approximately 50 HRc and approximately 54 HRc.

11. The power tool accessory of claim 10, wherein the tip portion has approximately the second hardness.

12. The power tool accessory of claim 5, wherein the cutting edges are induction hardened.

* * * * *